United States Patent Office 3,393,046
Patented July 16, 1968

3,393,046
METHOD FOR PURIFICATION OF ZINC SULPHATE SOLUTIONS
Georgy Petrovich Giganov, Ulitsa Metallurgov 33, kv. 19; Gennady Leonidovich Pashkov, Ulitsa Proletarskaya 124, kv. 73; Mikhail Ivanovich Batjukov, Prospekt Lenina 18, kv. 52; Akhat Salemkhatovich Kulenov, Prospekt Lenina 36, kv. 50; Taimurz Khadzhiomarovich Tserekov, Prospekt Lenina 16/a, kv. 31; Georgy Arkadievich Pelymsky, Ulitsa Kosmicheskaya 3, kv. 21; Alexandr Efimovich Porkhunov, Ulitsa Promyshlennaya 5, kv. 1; and Jury Ivanovich Pavlov, Ulitsa Kosmicheskaya 3, kv. 23, all of Ustkamenogorsk, U.S.S.R.
No Drawing. Filed Feb. 21, 1967, Ser. No. 617,493
Claims priority, application Union of Soviet Socialist Republics, Feb. 21, 1966, 1,056,728
2 Claims. (Cl. 23—125)

ABSTRACT OF THE DISCLOSURE

Chlorine is removed from zinc sulfate solution by treatment with a solution of an aliphatic amine containing 7–10 carbon atoms in kerosene in proportions of 1–3:9–7 by volume.

---

This invention relates to methods for the purification of zinc sulfate solutions obtained in the course of zinc production.

It is known to purify zinc sulfate solutions from chlorine by treatment with a chlorine-combining reagent, e.g. copper cake, followed by separating the chloride obtained, the usual separation techniques being settling or filtration.

The known methods have a disadvantage in that the extent to which chlorine is removed from zinc sulfate solutions is low, so that the electrolytic production of zinc from said solutions involves the consumption of excessively high amounts of non-ferrous metals.

A further disadvantage of the known methods is that the purification process is time consuming and requires the employment of a considerable body of process equipment.

It is an object of the present invention to provide a method for the purification of zinc sulfate solutions that will make it possible to obtain a higher degree of chlorine removal from the solutions with the resultant reduction of non-ferrous metal consumption in the course of the electrolytic production of zinc from said solutions.

It is another object of the present invention to shorten the purification process time, as well as to reduce the amount of the process equipment used.

These and other objects of the present invention are accomplished by using a chlorine-combining reagent consisting of an aliphatic amine, containing 7 to 10 carbon atoms, dissolved in kerosene, the amine and kerosene being taken in a volume of 1–3:9–7.

In order to prevent the extract, obtained in the course of purification, from separation into layers, it is expedient to add to the solution of amine in kerosene a saturated monohydric alcohol, the volume ratio of the amine, kerosene and alcohol being 1–3:8–6:1, respectively.

The method of the present invention is realized in the following manner.

Chlorine-containing zinc sulfate solutions are subjected to countercurrent extraction, wherein extracting solution consists of an aliphatic amine, having 7 to 10 carbon atoms, such as trioctylamine, trinonylamine, or tridecylamine, dissolved in kerosene, the amine-to-kerosene ratio being 1–3:9–7 by volume.

The volume ratio of the organic and aqueous phase equals 1:1–4.

The process of extractive purification involves 4 to 6 extraction stages, the time of phase mixing at each stage being one minute.

It is advantageous to carry out the process of purification in the presence of a saturated monohydric alcohol added to the solution of the amine in kerosene, the volume ratio of the amine, kerosene and alcohol being 1–3:8–6:1, respectively.

Extraction yields an organic phase consisting of the extract of amine hydrochloride in kerosene or in kerosene and alcohol, and an aqueous phase consisting of the zinc sulfate solution freed of chlorine. The organic phase is separated from the aqueous phase by a known technique and thereafter washed with water to extract zinc admixtures present. Washing is effected countercurrently, the number of washing stages being from 2 to 4, provided the organic and the aqueous phase are taken in a ratio of 5–10:1 by volume and the washing time at each stage equals one minute.

Aqueous solutions, obtained as a result of washing the organic phase, are combined with the starting zinc sulfate solution to be purified of chlorine.

Chlorine recovery from the organic phase is carried out by 4-to-6-stage extraction with 10% aqueous ammonia, the volume ratio of the organic and the aqueous phase being 15–20:1, and re-extraction time at each stage being equal to one minute.

Upon chlorine removal the organic phase is recycled to the extraction step.

The process of purification of zinc sulfate solutions is carried in Pachuca-type apparatus.

Ammonium chloride solutions obtained in the process of chlorine re-extraction are evaporated to recover ammonium chloride in the solid form.

For a better understanding of the present invention, the following example is presented by way of illustration.

Example

Chlorine is removed from the zinc sulfate solution (pH=5), containing 143 g./l. Zn, 2.1 g./l. Cd, and 0.55 g./l. Cl, by the countercurrent 4-stage extraction procedure. The extracting solution consists of a mixture of amines (65% of trioctylamine and 35% of primary and secondary amines having from 7 to 12 carbon atoms) dissolved in kerosene and isooctyl alcohol, the volume ratio of amines, kerosene and alcohol being 1:8:1, respectively.

At the extraction step, the volume ratio of the organic and the aqueous phase equals 1:4.

The purified zinc sulfate solution contains 141 g./l. Zn, 2.1 g./l. Cd, and 0.03 g./l. Cl.

The degree of chlorine extraction from the zinc sulfate solution to the organic phase amounts to 94.6%.

Although the present invention has been described with reference to a preferred embodiment thereof, it will be readily understood by those skilled in the art that various changes and modifications can be resorted to without departing from the spirit and scope of the present invention.

These changes and modifications are to be considered as falling within the spirit and scope of the present invention as defined in the appended claims.

We claim:
1. A process for the removal of chlorine from zinc sulfate solutions comprising extracting the chlorine by treating said solution with an aliphatic amine containing 7 to 10 carbon atoms, said amine being dissolved in kerosene in the ratio amine to kerosene: 1–3 to 9–7 by volume, and separating the chlorine from the amine.

2. The process of claim 1 wherein a saturated monohydric alcohol is added to the solution of amine in kerosene, whereby the ratio of amine:Kerosene:alcohol is 1–3:8–6:1 by volume respectively.

(References on following page)

References Cited

UNITED STATES PATENTS

| | | | |
|---|---|---|---|
| 1,901,925 | 3/1933 | O'Brien et al. | 23—125 |
| 2,245,086 | 6/1941 | Bray et al. | 204—55 |
| 2,393,741 | 1/1946 | Bray et al. | 204—55 |
| 3,317,412 | 5/1967 | Dahlmann | 204—55 |

OTHER REFERENCES

Bray J. L. and Morral, F. R.: "Journal of The Electrochemical Society," volume 78; pp. 309–316; 1940.

OSCAR R. VERTIZ, *Primary Examiner.*

G. PETERS, *Assistant Examiner.*